April 18, 1950 A. G. NORDEN 2,504,219
FLESHING MACHINE
Filed Aug. 24, 1949 3 Sheets-Sheet 2
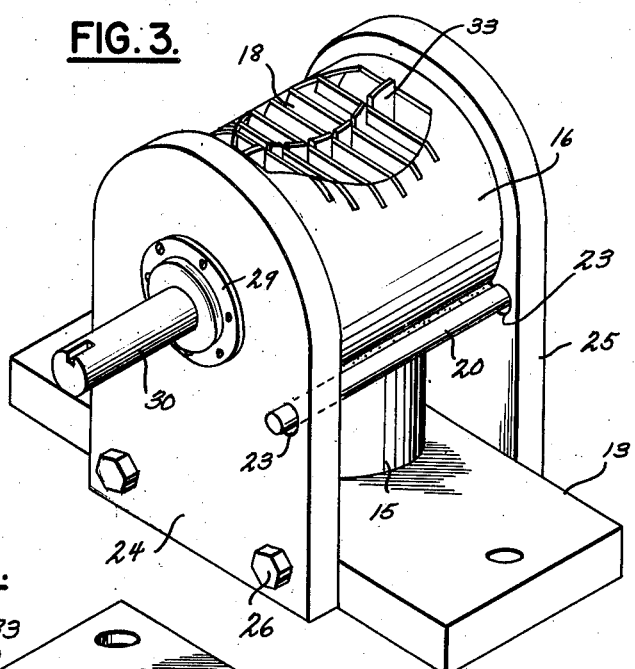
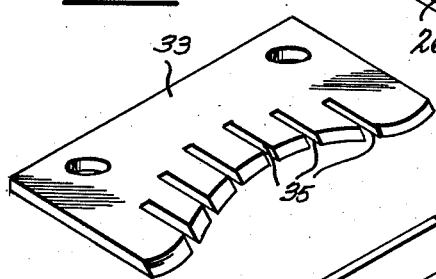
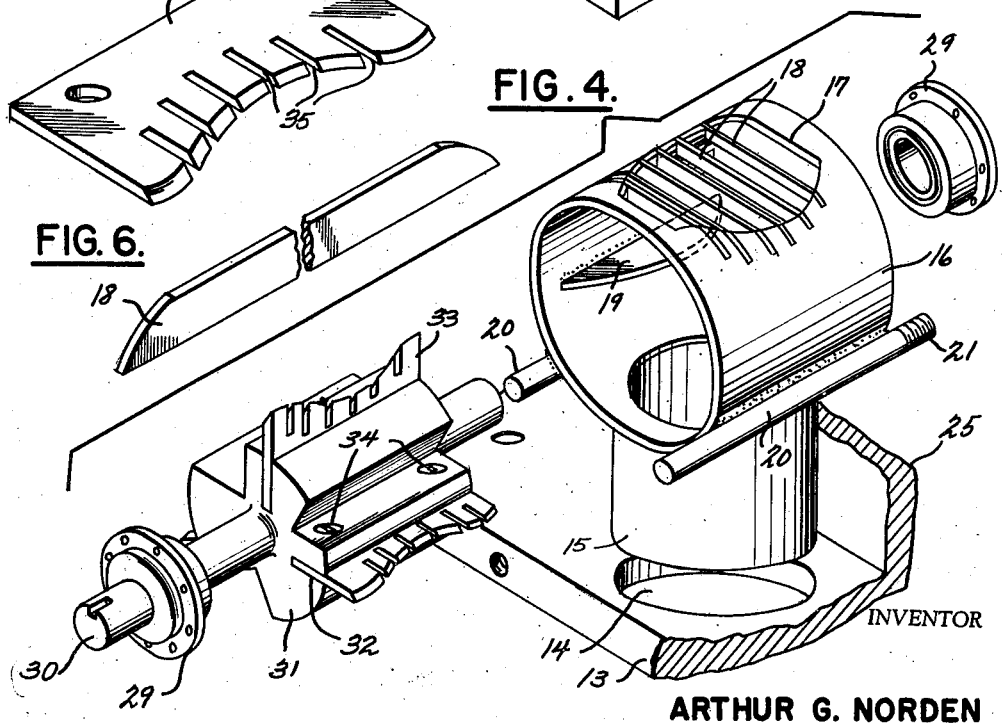
INVENTOR
ARTHUR G. NORDEN
BY Wilkinson & Mawhinney
ATTORNEYS April 18, 1950     A. G. NORDEN     2,504,219
FLESHING MACHINE
Filed Aug. 24, 1949     3 Sheets-Sheet 3
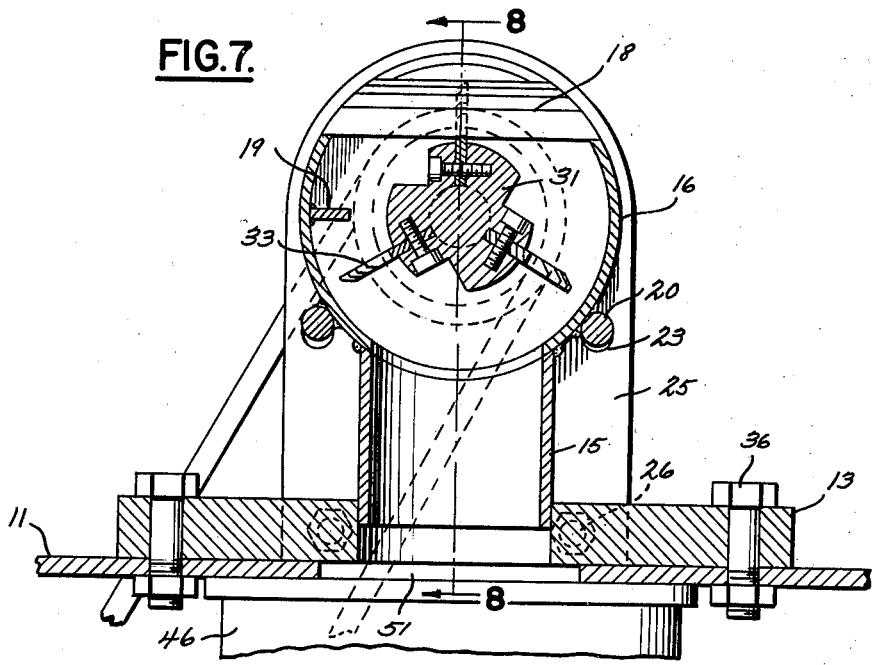
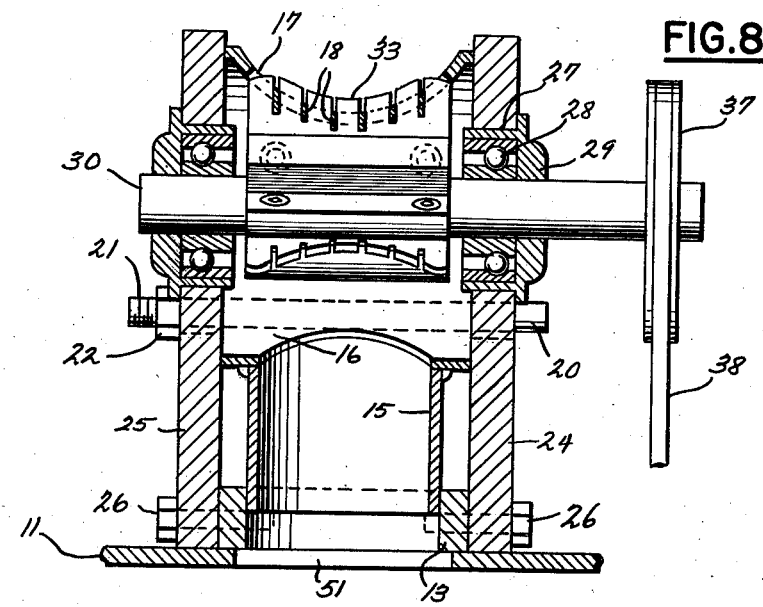
INVENTOR
ARTHUR G. NORDEN
BY *Wilkinson & Mawhinney*
ATTORNEYS Patented Apr. 18, 1950

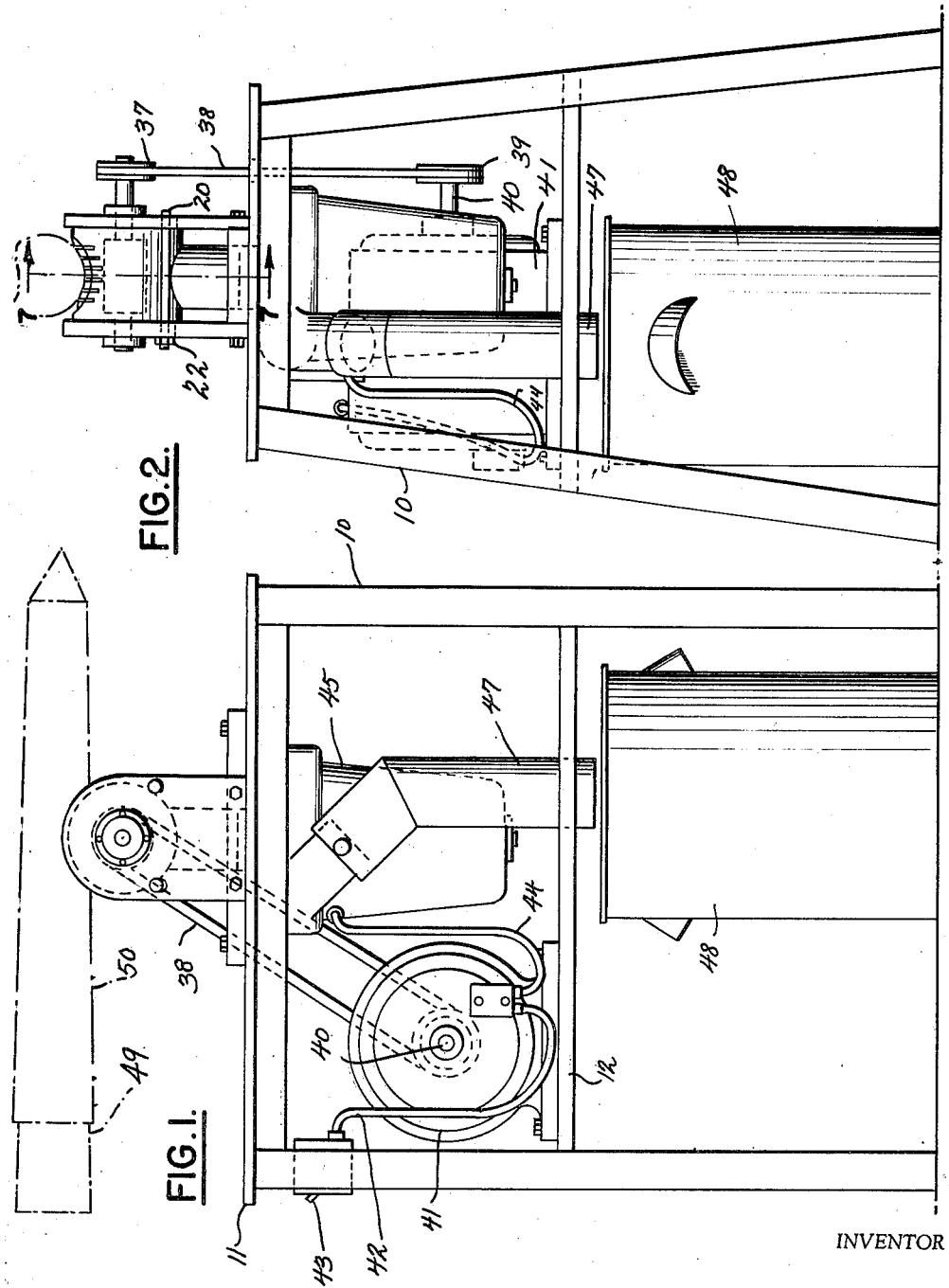

2,504,219

UNITED STATES PATENT OFFICE 2,504,219

FLESHING MACHINE

Arthur G. Norden, Defiance, Ohio

Application August 24, 1949, Serial No. 112,121

12 Claims. (Cl. 69—37)

The present invention relates to improvements in fleshing machine and has for an object to provide an improved machine for removing fat and tissue from animal pelts in which blades with curved edges afford greater cutting and scraping surface to the area of the pelt being operated on, and in which such blade or blades are slotted to cooperate with a grill beyond which the cutting edge of the blade extends a desired adjustable distance with the grill acting as a gage to restrict movement of the pelt toward the cutting and scraping projected blade edges whereby the pelts are prevented from being fouled in the blade with resultant damage to the highly rotating apparatus.

Other objects of the invention are to provide an improved fleshing head or unit of a compact, simple and inexpensive construction which may be mounted upon a suitable support and which admits of connection in a simple hook-up with an electric or other motor by which the rotary blade holder of the device may be rapidly rotated; and in which an electric or other vacuum unit is mounted in conjunction with a cutting device so that the fat and tissue removed by the cutting action may be carried away by the vacuum unit and deposited in a suitable container.

With the foregoing and other objects in view, the invention will be more fully described hereinafter, and will be more particularly pointed out in the claims appended hereto.

In the drawings, wherein the symbols refer to like or corresponding parts throughout the several views, Figure 1 is a front elevational view of an improved fleshing machine constructed in accordance with the present invention and showing an application of a pelt thereto in the act of fleshing the same.

Figure 2 is an end elevational view of the same taken from the right end of Figure 1.

Figure 3 is a perspective view, taken on an enlarged scale, of the fleshing head or device apart from the machine as a whole.

Figure 4 is an exploded perspective view of the same.

Figure 5 is a perspective view of a type of blade employed.

Figure 6 is a perspective view, with parts broken away and parts shown in section of a type of grill strip employed.

Figure 7 is a vertical section taken on an enlarged scale through the fleshing head or device on the line 7—7 in Figure 2, and Figure 8 is a vertical longitudinal section taken on the line 8—8 in Figure 7.

Referring more particularly to the drawings 10 designates a machine frame on which is supported a table 11 and a shelf 12.

A base block 13 for the fleshing head or unit is mounted upon the table 11 and is formed with a vertical opening 14 into which is snugly fitted a pipe section 15 carried by and extending downwardly from a housing or shell 16. The axis of the pipe section 15 will preferably be substantially vertical and that of the housing or shell 16 approximately horizontal; these two parts 15 and 16 being tubular, preferably cylindrical, and made conveniently of sheet steel or other metal with the ends of the housing 16 open and with the pipe section 15 communicating with the interior of the housing 16. The parts 15 and 16 may be welded or otherwise secured together.

The housing 16 is formed with a concave open top 17 across which are disposed in spaced relation a number of thin metal or other strips 18 forming a grill. The upper edges of these strips conform generally to the concave pattern of the opening 17. The strips are set lengthwise at substantially right angles to the axis of the housing 16.

Within the housing 16 is a baffle 19 having a convex free edge for conforming generally to the concave edge of the blade as hereinafter explained. The baffle may also be of metal and welded or otherwise secured to a side wall of the housing 16.

Clamping studs 20 are welded or otherwise secured to opposite side walls of the housing 16 preferably at lower portions thereof adjacent the pipe section 15. The ends of these clamping studs 20 project beyond the open ends of the housing 16. At one or both ends these studs 20 may be threaded as indicated at 21 in order to receive nuts 22.

The projecting ends of the clamping studs 20 are adapted to fit loosely and adjustably into vertically elongated slots 23 in side plates 24 and 25 which are erected at opposite sides of the base block 13 to which said plates are secured by bolts or other appropriate fastenings 26. The side plates 24 and 25 fit tightly against opposite open ends of the housing 16 and form preferably an air tight fit therewith.

In the plates 24 and 25 are horizontally aligned openings 27 in which are fitted roller bearings 28 within flanged cap plates 29. Rotatably mounted in the bearings and through the housing 16 is a spindle 30 carrying a rotary blade holder 31 which is contained in the housing 16 and which is provided with slots 32 adapted to receive cutting blades 33 held therein by screws 34 or other appropriate fastenings. The blades are formed with concave outer cutting edges which are suitably beveled and sharpened for the purpose. Such blades are further provided with spaced slots 35 adapted to receive thin strips 18 of the grill in the rotary motion of the blade holder 31. The blades will be adjusted so that the upper edges thereof in the uppermost vertical position will project a substantial distance above the upper edges of the grill strips 18 as indicated in Figures 3, 7 and 8.

The base block 13, side plates 24, 25, housing 16, the blade holder 31 and its blades and the pipe section 15 together form a fleshing head or unit which may be detachably mounted upon the table 11 by means of bolts 36 or other fastenings.

An end of the spindle 30 projects beyond the housing 16 and receives fast thereon a pulley 37 engaged and driven by a belt 38 which in turn is engaged with a drive pulley 39 fast on the armature shaft 40 of an electric or other motor 41 installed upon the shelf 12.

An input cable 42 connects with a switch box 43 into which may be plugged a lead from a suitable source of electric current supply. The input cable is connected in a well-known manner to the electric motor 41 and also to a cable 44 for supplying electric current to an electric vacuum unit 45 supported beneath the table 11. This unit is provided with an intake pipe 46 and an exhaust pipe 47 which delivers to a container 48 removably placed below the machine frame 10. The table 11 is provided with an opening 51 registering with the base block opening 14 and with the intake pipe 46 of the vacuum unit.

The pelt 50 to be fleshed is mounted upon a tapered rounded pole 49.

The clamping studs 20 may be adjusted up and down in the vertically elongated openings 23. Inasmuch as the rotary blade holder 31 is supported by the fixed side plates 24 and 25 this up and down adjusting movement of the housing 16 and pipe section 15 determines the distance which the cutting edges of the blades 33 project above the upper edges of the grill strips 18. The adjustment may be made experimentally for most satisfactory cutting action. After adjustment the nuts 22 are tightened on the threaded ends 21 against the side plate 25 which would bind the housing 16 to the side plate 25.

In the use of the device, the pelts to be fleshed carried on the tapered pole 49 are passed over the grill 18 in a series of hand motions with the spindle and rotary blade holder rotating at a high rate of speed. The pole will be rotated over the grill and advanced axially of the pole so that all parts of the pelt will be brought into contact with the rapidly rotating blades 33 which produce a cutting and scraping action. The blades remove the fat and tissue from the pelts which immediately comes under the influence of the vacuum unit and is drawn down through the pipe section 15 and openings 14 and 51 into the intake pipe 46 and finally ejected through the exhaust pipe 47 into the container 48. The interior of the housing 16 is subject to the vacuum pressure of the unit 45 and the atmospheric air which satisfies this vacuum can be drawn in only through the opening 17 about the grill strips 18; or in other words at the point at which the fat and tissue are removed from the pelt by the blade action.

It will be appreciated that the concave slotted type blade exposes more surface for scraping and cutting action at any one time and the concave grill contributes mutually to this same function and result. Moreover the grill prevents any parts of the pelt being fleshed from being fouled in the blade with resultant damage.

As the blades 33 rotate past the baffle 19 the latter act to dislodge and remove entrained matter to the end of keeping the blades and the slots thereof clean just before they re-enter the grill strips.

The blades 33 are radially disposed in the rotary holder 31 for best results. One wall of each slot 32 is preferably coincident with a radius of the holder 31.

Although I have disclosed herein the best form of the invention known to me at this time, I reserve the right to all such modifications and changes as may come within the scope of the following claims.

What I claim is:

1. An improved fleshing machine comprising a grill, and a rotary blade having slots to receive the parts of the grill.

2. An improved fleshing machine comprising a housing having an opening, a grill across the opening composed of narrow spaced strips, a rotary blade holder in the housing, and a blade carried by said holder and having slots to receive said strips.

3. An improved fleshing machine as claimed in claim 2 characterized by the fact that the grill and blade edge are concave with the cutting blade edge adapted to project out beyond the grill.

4. An improved fleshing machine as claimed in claim 2 further comprising a vacuum unit connected to said housing.

5. An improved fleshing machine as claimed in claim 2 in which the grill is concave and receives the pelt mounted inside out on a tapered pole.

6. An improved fleshing machine as claimed in claim 2 characterized by the fact that the rotary blade holder and the housing are relatively adjustable to vary the distance the cutting free edge of the blade projects from the grill strips.

7. An improved fleshing machine comprising a rotary blade holder, a fixed support for said blade holder, a housing adjustably mounted relatively to said holder and having a concave opening, a concave grill over the opening composed of spaced thin strips, and a blade carried by the blade holder having a slotted concave free cutting edge to receive the grill strips and project therebeyond a distance determined by the adjustment of the housing.

8. An improved fleshing machine according to claim 7 in which the fixed support has vertically-elongated slots, and the housing is carried by clamping studs smaller in diameter than the elongation of the slots and adjustably fitted therein with means to clamp the studs to the support.

9. An improved fleshing machine comprising a base, side plates erected to said base, a rotary blade holder mounted in said plates, a blade having a slotted cutting edge carried by said blade holder, a housing receiving said holder and having an opening, a grill across the opening composed of thin strips adapted to receive the slots in said blade, and means to adjust the position of the housing and its grill relatively to said plates, the blade holder and slotted edge of the blade.

10. An improved fleshing machine according to claim 9 characterized by the fact that the base is mounted on a machine table having a shelf containing an electric motor coupled to drive said blade holder at high speed.

11. An improved fleshing machine according to claim 9 in which a pipe section extends down from the housing and communicates with the intake of a vacuum unit.

12. An improved fleshing machine according to claim 11 wherein the pipe section slides in an opening in the base as the housing is adjusted up and down between the plates.

ARTHUR G. NORDEN.

REFERENCES CITED

The following references are of record in the file of this patent:

UNITED STATES PATENTS

| Number | Name | Date |
|---|---|---|
| 2,492,534 | Porteous | Dec. 27, 1949 |